UNITED STATES PATENT OFFICE.

GEORG MERLING, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING KETO COMPOUNDS.

1,070,622.    Specification of Letters Patent.    Patented Aug. 19, 1913.

No Drawing.    Application filed October 8, 1912.    Serial No. 724,635.

*To all whom it may concern:*

Be it known that we, GEORG MERLING and HUGO KÖHLER, doctors of philosophy, chemists, citizens of the German Empire, residing, respectively, at Elberfeld and Leverkusen, near Cologne, Germany, have invented new and useful Improvements in Processes of Producing Keto Compounds, of which the following is a specification.

The present invention concerns the production of keto compounds and more particularly of keto compounds containing the radical or nucleus $$CH_3-CO-\underset{|}{\overset{|}{C}}-CH_2-N\begin{matrix}CH_3\\CH_3\end{matrix}$$

which have proved to be valuable intermediate products for the manufacture of erythrene and its homologues. The process for their production consists in treating acetone and its homologues with a dimethyl-amino-methane compound, and more particularly with dimethylaminoöxymethane or tetramethyldiaminomethane either with or without condensing agents, such as caustic alkalis, alkali carbonates and bicarbonates, alkaline earths, aluminium hydrate, sodium phosphate, organic bases and salts. The condensation proceeds, although slowly, even at ordinary temperature and without condensing agents, and the presence or absence of water or of other solvents does not injuriously interfere with the reaction. Heating and condensing agents accelerate the reaction. Dimethylaminoöxymethane and tetramethyldiaminomethane can be used as such or as mixtures of formaldehyde and dimethylamin solutions in the proper molecular proportions or in the latter case also *in statu nascendi*. These reactions proceed e. g. according to the following equations:

(1) $CH_3-CO-CH_2(R)+HO-CH_2-N(CH_3)_2=$
$CH_3-CO-CH(R)-CH_2N(CH_3)_2+H_2O$
(2) $CH_3-CO-CH_2(R)+(CH_3)_2N-CH_2-(CH_3)_2=$
$CH_3-CO-CH(R)-CH_2-N(CH_3)_2+NH-(CH_3)_2$ (R = hydrogen or alkyl).

Besides these products ketodiamins of the formula:

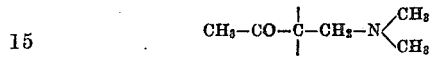

are obtained for instance by the two-fold introduction of the residue $-CH_2-N(CH_3)_2$ into the corresponding ketone. These keto- diamins can be separated from the keto-monoamins by fractional distillation.

In order to illustrate the new process more fully the following examples are given, the parts being by weight:

Example 1: Production of beta-acetyl-propyldimethylamin:

$CH_3-CO-CH(CH_3)-CH_2-N(CH_3)_2$ and beta-beta-acetylmethyltrimethylenetetramethyldiamin:

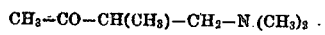

from dimethylaminoöxymethane and methylethylketone.

(*a*) 2000 parts of methylethylketone, 750 parts of dimethylaminoöxy-methane $HO-CH_2-N(CH_3)_2$ (see Henry, *Bull. Acad. Royale de Belgique*, vol. 28, 1894, p. 366), 1000 parts of water and 300 parts of baryta water saturated at ordinary temperature are heated in an autoclave to 40° C. until a test portion after acidulation with acetic acid, is not any more rendered turbid by a solution of anilin acetate which requires about 3 to 4 days. The baryta is then precipitated from the clear brown solution by carbonic acid or alkaline bicarbonate, filtered off and the excess of the methyl-ethylketone and the ketobases prepared therefrom are precipitated from the filtrate by means of carbonate of potash and dried after separation from the aqueous solution with carbonate of potash. The excess of methylethylketone is now distilled off, advantageously under somewhat reduced pressure in an apparatus suitable for fractional distillation and the remaining oil is distilled *in vacuo*. The crude mixture of the bases distils over between 50 and 100° C. at a pressure of 18 mm. as a colorless oil, while a small quantity (20–30 parts) of a dark syrupy residue remains. The crude bases can be easily separated by repeated fractional distillations *in vacuo* into beta-acetyl-propyldimethylamin $CH_3-CO-CH(CH_3)-CH_2-N(CH_3)_2$ and beta-beta-acetylmethyltrimethylenetetramethyldiamin:

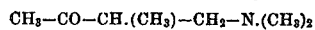

The former is a colorless thin oil of a basic smell boiling at 51 to 51.5° C. (13 mm.) and is identical with the beta-acetylpropyldimethylamin, produced according to German Letters Patent No. 233519. The yield amounts to nearly 80 per cent. of the theory. The beta-beta-acetylmethyltrimethylenetetramethyldiamin, which is produced in a small quantity, is a colorless, thick, almost odorless oil boiling at 110–112° C. (18 mm.). The production of beta-beta-acetylmethyltrimethylenetetramethyldiamin can be prevented by reducing the quantity of the baryta water to 20–100 parts but otherwise under the same conditions as above described. The completion of the reaction requires in this case nearly a fortnight.

(b) 765 parts of aqueous dimethylamin solution (58.77 per cent.) are added to a mixture which has to be stirred, of 2500 parts of methylethylketone with 750 parts of aqueous formaldehyde (40 per cent.). The temperature gradually rises to 35° C. After standing for about 25 days at ordinary temperature the pungent smell of dimethylamin-oxymethane has disappeared and the reaction is finished. The light red solution is worked up in the same manner as described in the preceding example, the yield being about 600 parts of beta-acetyl-propyldimethylamin and 250 parts of beta-beta-acetylmethyltrimethylenetetramethyldiamin.

Example 2: Production of beta-acetylpropyldimethylamin and beta-beta-acetylmethyltrimethylenetetramethyldiamin from tetramethyldiaminomethane and methylethylketone. 750 parts of aqueous formaldehyde (40 per cent.) are gradually dropped into 1350 parts of an aqueous dimethylamin solution (58.77 per cent.) care being taken to stir well and cool during this operation and 2500 parts of methylethylketone and 100 parts of caustic soda lye (1 per cent.) are added to the solution of tetramethyldiaminomethane thus obtained. After this solution has been heated to 30° C. for about 20 days the pungent smell of tetramethyldiaminomethane has disappeared. The light red solution is saturated with carbonic acid or bicarbonate is added to it, the bases and the excess of methylethylketone are separated and dried with potash. The further working up of the crude mixture is then carried out in the manner as described in the preceding examples. In this way about 700 parts of beta-acetylpropyldimethlyamin and 100 parts of beta-beta-acetylmethyltrimethylenetetramethyldiamin are obtained. The same products but with a considerably smaller yield are obtained by boiling under a reflux condenser for 4 days equal molecules of ethylmethylketone and pure tetramethyldiaminomethane of the boiling point 85°.

Example 3: Production of beta-acetylethyldimethylamin

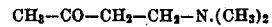

and beta-acetyltrimethylene-tetramethyldiamin:

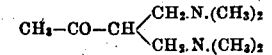

from dimethylaminoöxymethane and acetone. 765 parts of an aqueous dimethylamin solution (58.77 per cent.) are gradually dropped into 750 parts of aqueous formaldehyde (40 per cent.) which has to be well stirred and cooled and the solution of dimethylaminoöxymethane thus obtained is mixed with 2000 parts of acetone 500 parts of sodium lye (0.3 per cent.). The temperature of the mixture gradually rises on standing from 10 to 30° C. After 3 to 4 days standing at ordinary temperature the reaction is complete. The free alkali is removed from the brown solution by saturation with carbonic acid or by addition of bicarbonate and the oil is separated from the aqueous solution by potash and dried over potash. The excess of acetone is removed by distillation. The residue, a brown oil, is distilled in vacuo and the fraction from 45–94° C. (19–20 mm.) a colorless oil (800 parts) is collected. The mixture thus obtained consists of about 33 per cent. of beta-acetylethyldimethylamin and of 67 per cent. of beta-acetyltrimethylenetetramethyldiamin. The former base is identical with the ketobase from dimethylamin and methyleneacetone

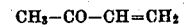

(described in German Letters Patent No. 233519). It is a colorless thin liquid oil having an intense smell and boils at 57–58° C. (18 mm.). The beta-acetyltrimethylenetetramethyldiamin is a thick colorless almost odorless oil boiling at 96–98° C. (16 mm.).

Example 4: Production of beta-acetylethyldimethylamin and beta-acetyltrimethylenetetramethyldiamin from tetramethyldiaminomethane and acetone. 750 parts of aqueous formaldehyde (40 per cent.) are gradually dropped into 1530 parts of aqueous dimethylamin solution (58.77 per cent.) which is being stirred and cooled and 2000 parts of acetone, 400 parts of baryta water (saturated at ordinary temperature) and 500 parts of water are then added. After 20 days' heating from 25 to 30° C. bicarbonate is added to the brown solution in order to remove the baryta. Barium carbonate is removed by filtration. The oil is separated with potash from the filtrate, dried and is worked up as described in Example 3. About 700 parts of the mixture of crude bases boiling at from 50 to 93° C. (19 mm.) are obtained, containing (in contrast with the yields of ketomonoamin and ketodiamin obtained according to Example 3) 80 per cent. of a beta-acetylethyldimethylamin and 20 per cent. of beta-acetyltrimethylenetetramethyldiamin.

We claim:—

1. The process of producing a polymethylamino substituted keto-compound which comprises reacting on a ketone with a dimethylaminomethane compound.

2. The process of producing a dimethylamino substituted ketone which comprises reacting on a ketone with dimethylaminooxymethane.

3. The process of producing a polymethylamino substituted keto-compound which comprises reacting on a ketone with a dimethylaminomethane compound with the addition of a condensing agent.

4. The process of producing a dimethylamino substituted keto-compound which comprises reacting on a ketone with dimethylaminoöxymethane with the addition of a condensing agent.

5. The process of producing a polymethylamino substituted keto-compound which comprises reacting on a ketone with a dimethylaminomethane compound with the addition of an inorganic base as a condensing agent.

6. The process of producing a polymethylamino substituted ketone which comprises reacting on a ketone with dimethylaminooxymethane with the addition of an inorganic base as a condensing agent.

7. The process of producing keto compounds containing the radical or nucleus

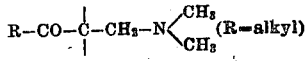

which comprises treating a ketone with a dimethylaminonmethane compound.

8. The process of producing keto-compounds containing the radical or nucleus

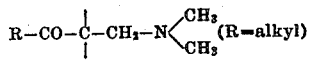

which comprises treating a ketone with a dimethylaminomethane compound with the addition of a condensing agent.

9. The process of producing keto-compounds containing the nucleus

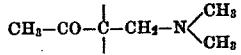

which comprises treating a methyl ketone with a dimethylaminomethane compound.

10. The process of producing keto-compounds containing the nucleus

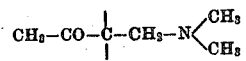

which comprises treating a methyl ketone with a dimethylaminomethane compound with the addition of an inorganic base as a condensing agent.

11. The process of producing keto compounds containing the radical or nucleus

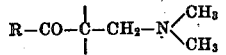

(R=alkyl), which comprises treating a ketone with dimethylaminoöxymethane.

12. The process of producing keto compounds containing the radical or nucleus

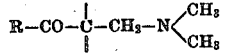

(R=alkyl) which comprises treating a ketone with dimethylaminoöxymethane with the addition of a condensing agent.

13. Process of producing keto compounds containing the radical:

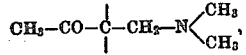

which process comprises treating a ketone with dimethylaminoöxymethane and then isolating the keto compound produced, substantially as described.

14. Process of producing keto compounds containing the radical:

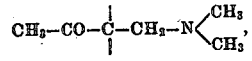

which process comprises treating a ketone with dimethylaminoöxymethane with the addition of a condensing agent and then isolating the keto compound produced, substantially as described.

In testimony whereof we have hereunto set our hands in the presence of two subscribing witnesses.

GEORG MERLING. [L. S.]
HUGO KÖHLER. [L. S.]

Witnesses:
HELEN NUFER,
ALBERT NUFER.

It is hereby certified that in Letters Patent No. 1,070,622, granted August 19, 1913, upon the application of George Merling, of Elberfeld, and Hugo Köhler, of Leverkusen, near Cologne, Germany, for an improvement in "Processes of Producing Keto Compounds," an error appears in the printed specification requiring correction as follows: Page 1, lines 44–45, second part of formula, for (2) $CH_3 - CO - CH_2(R) + (CH_3)_2N - CH_2 - (CH_3)_2 =$
$CH_3 - CO - CH(R) - CH_2 - N(CH_3)_2 + NH - (CH_3)$ read (2) $CH_3 - CO - CH_2(R) + (CH_3)_2N - CH_2 - N(CH_3)_2 =$
$CH_3 - CO - CH(R) - CH_2 - N(CH_3)_2 + NH - (CH_3)_2;$ and that the said Letters Patent should be read with this correction therein that the same may conform to the record of the case in the Patent Office.

Signed and sealed this 30th day of December, A. D., 1913.

[SEAL.]

J. T. NEWTON,
*Acting Commissioner of Patents.*